United States Patent [19]
Chang-Hong

[11] Patent Number: 5,727,771
[45] Date of Patent: Mar. 17, 1998

[54] FLUID OPENING AND CLOSING VALVE

[76] Inventor: Ahn Chang-Hong, 301-7, Kaksan-Dong, Dong-Gu, Daegu, Rep. of Korea

[21] Appl. No.: 688,292

[22] Filed: Jul. 29, 1996

[51] Int. Cl.⁶ .................................................. F16K 5/22
[52] U.S. Cl. ..................................... 251/184; 137/74
[58] Field of Search ........................... 251/181, 184, 251/185, 309; 137/74

[56] References Cited

U.S. PATENT DOCUMENTS

| | | | |
|---|---|---|---|
| 1,624,512 | 4/1927 | Shipley | 251/184 |
| 1,805,668 | 5/1931 | Kelley | 251/181 X |
| 3,108,779 | 10/1963 | Anderson | 251/184 X |
| 3,177,887 | 4/1965 | Priese | 137/74 |
| 4,345,738 | 8/1982 | Ripert | 137/74 X |
| 4,531,537 | 7/1985 | Smith | 251/309 X |
| 5,312,086 | 5/1994 | Hollingworth | 251/184 X |

FOREIGN PATENT DOCUMENTS 1115087 10/1961 Germany ................. 251/181

*Primary Examiner*—John Fox
*Attorney, Agent, or Firm*—Birch, Stewart, Kolasch & Birch, LLP

[57] ABSTRACT

In a valve for opening and closing a fluid path by rotating a plug in a sleeve made of teflon resin, a plug body and valve stem are connected together. The plug is pressed by a spring to form a seal so that a rotating and opening/closing operation of the plug is smooth. The plug is made in a shape of top cut conical form, wherein contacting protrusions which are formed at both ends of a fluid path are positioned within valve chamber to contact the plug. When a valve sheet of teflon resin is burned by fire, the plug is urged downward so as to closely contact the surfaces of the contacting protrusions so that fluid does not leak around the plug.

6 Claims, 3 Drawing Sheets

FLUID OPENING AND CLOSING VALVE

BACKGROUND OF THE INVENTION

The present invention relates to a fluid opening and closing valve, and more particularly, to a fluid valve which open and closes a fluid passage by rotating a plug in a sleeve made of teflon resin. The plug body and valve stem are connected together. The plug is pressed by a spring to form a seal, so that a rotating and opening/closing operation of the plug is smooth. The plug is made in a shape of top cut cone to form a frustroconical body. Contacting protrusions are formed at both ends of fluid path and are positioned within a valve chamber, whereby when a valve sheet of teflon resin is burned by fire, the plug is urged downward so as to closely contact a surface of the contacting protrusions so that the valve provides a fire safe design.

A conventional valve for opening and closing a fluid by a plug is made as shown in FIG. 5 such that a plug 15 and valve stem 16 are integrally made to permit close contact of the plug 15 with the sleeves. In this valve, since the plug and sleeve are in close contact with one another in order to prevent formation of a gap between the plug and sleeve during numerous opening and closing operations, much rational force is required for opening and closing the valve.

And, when a fire occurs adjacent to the valve whereby the valve sleeve made of teflon resin is burned, a wide gap is produced at portions where the valve sleeve is burned even if the valve is shut whereby fluid leaks through the gap.

OBJECT OF THE INVENTION

Therefore, the present invention is directed to solve the problems discussed above, and it is an object of the present invention to provide a fluid opening/closing valve capable of preventing a leakage of fluid even when fire occurs adjacent to the valve so that a fire safe design valve is made.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Hereinafter, a preferred embodiment of the present invention will be described more in detail with reference to the accompanying drawings.

Figure 1:
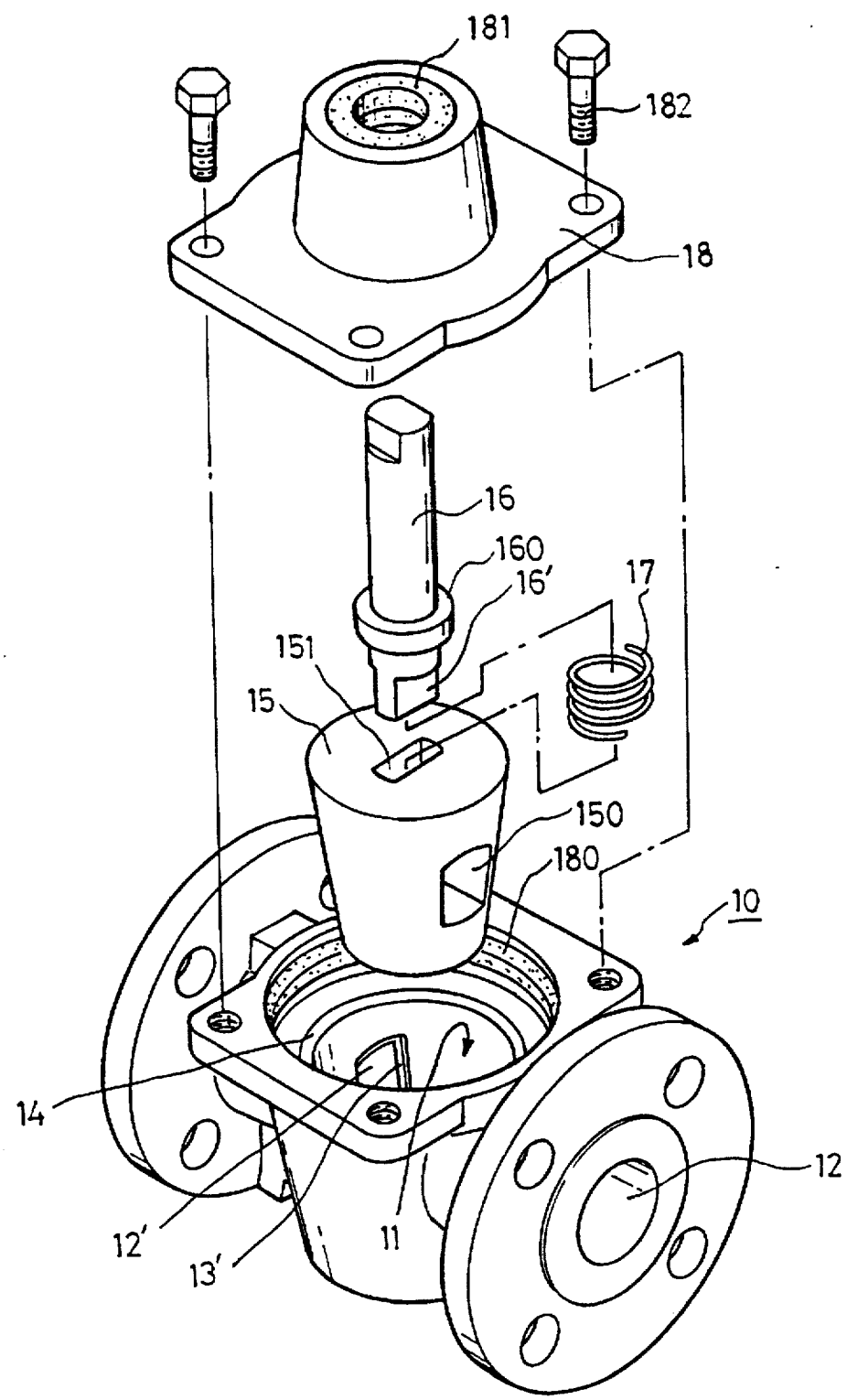
FIG. 1 is an exploded perspective view of the present invention.
Figure 2:
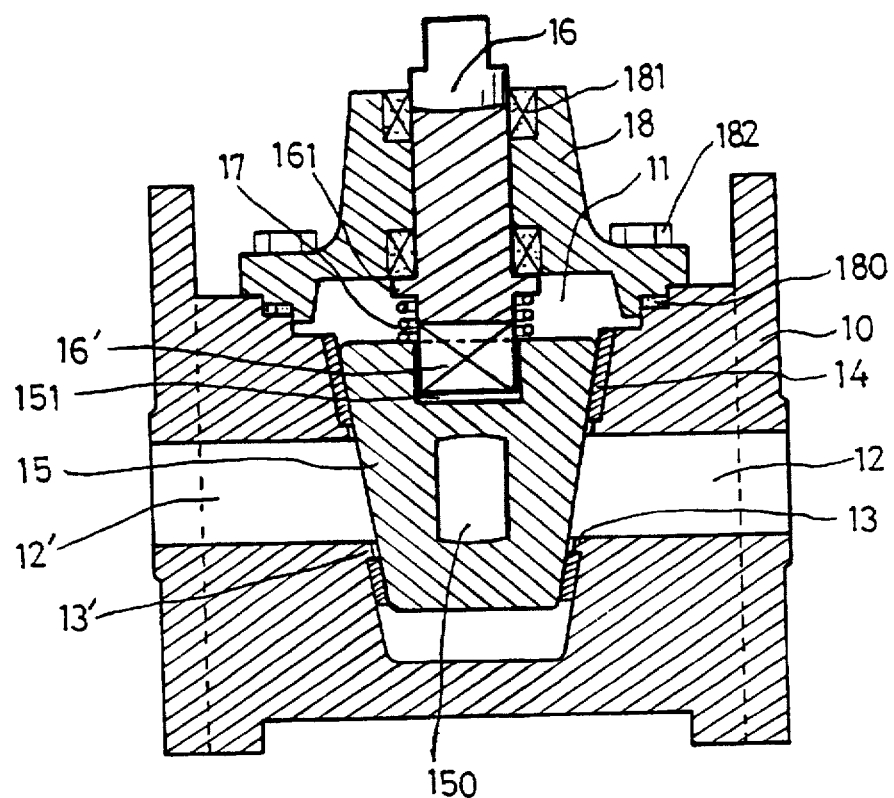
FIG. 2 is a longitudinal cross sectional view of the present invention.
Figure 3:
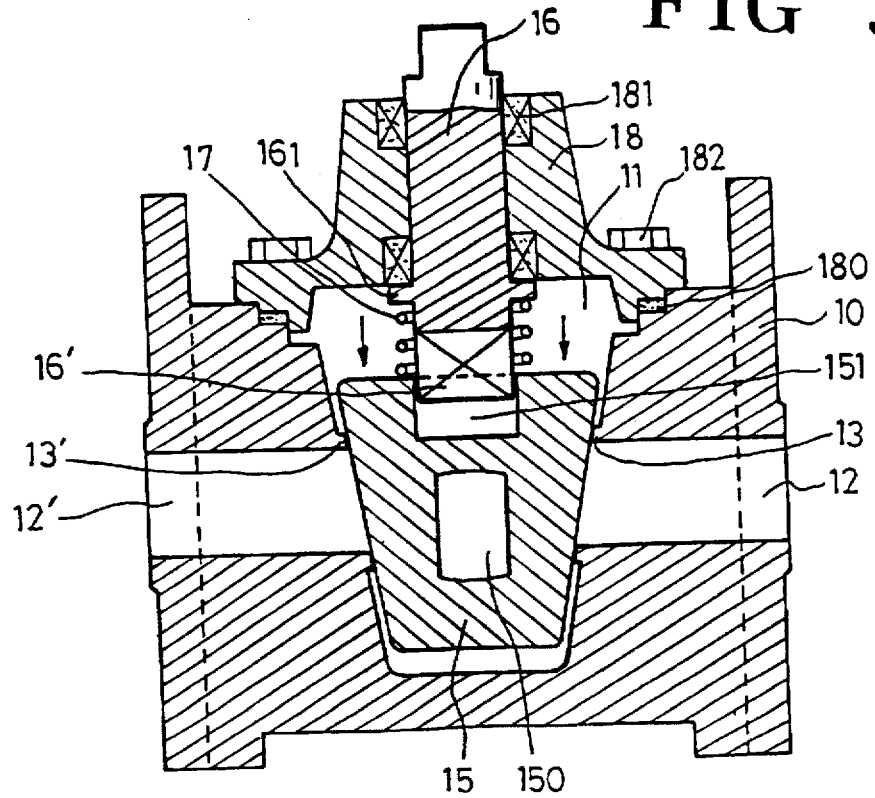
FIG. 3 is also a longitudinal cross sectional view showing an operation during a fire.

As shown in FIG. 1 to FIG. 3, the fluid opening/closing valve of the present invention is made such that a valve chamber 11 of a valve body 10 is defined in a shape of top cut conical form (frusto-conical body), in which a side surface thereof is inserted into a valve sleeve made of teflon resin. Contacting protrusions 13, 13' protrude inward relative to valve sleeve 14. At an angle with a valve plug 15 are formed fluid paths 12, 12' positioned within the valve chamber 11. The valve plug 15 having a pierced through hole 150 is made in top cut conical shape (frusto-conical shape). A connecting groove 151 is defined at a top center of the valve plug 15 so that a connecting portion 16' of valve stem 16 rotatably fixed to a valve cover 18 is inserted thereto. A projected flange 161 is formed at the valve stem 16 and a compressional coil spring 17 is urged at its bottom side so as to press the valve plug 15. A valve cover 18 is assembled on top of the valve chamber 11.

Figure 4:
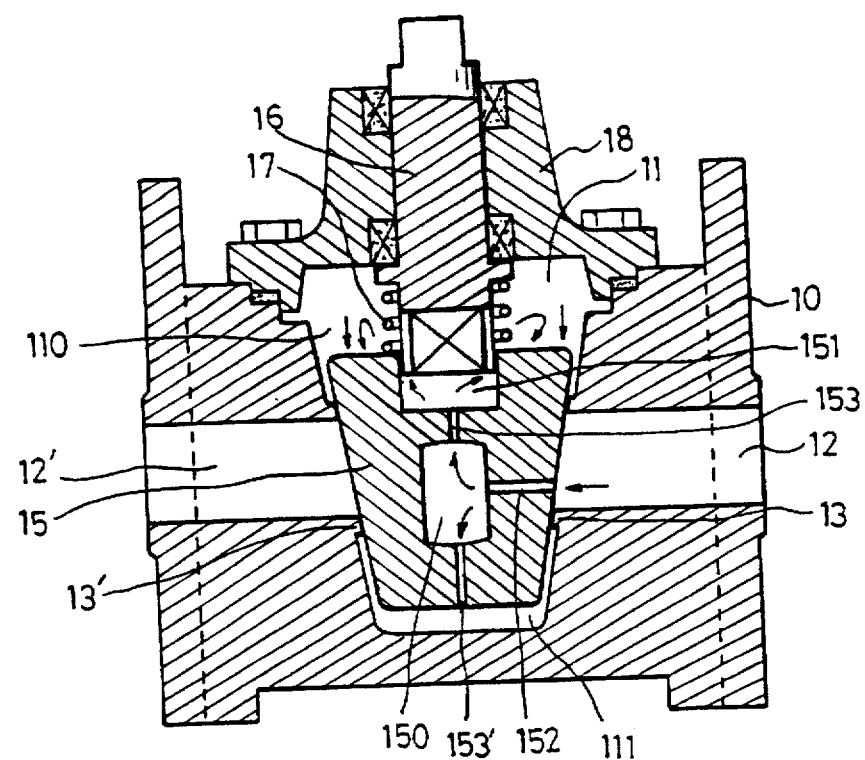
FIG. 4 is still also a longitudinal cross sectional view of another embodiment showing an operation during a fire.
Figure 5:
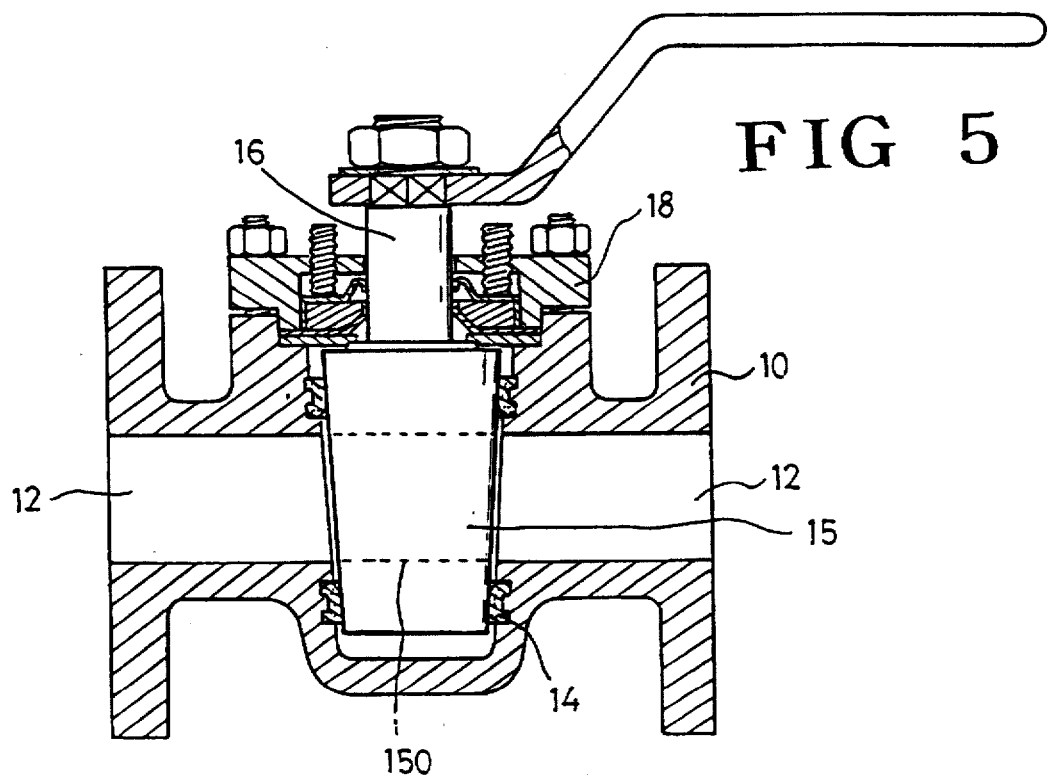
FIG. 5 is a longitudinal cross sectional view of a conventional valve for comparing with the present invention.

And, FIG. 4 is a view of another embodiment of the present invention, in which top and bottom auxiliary holes 153, 153' are vertically formed at a center of the pierced through hole 150 of the valve plug 15 so as to communicate with top and bottom valve chambers 110, 111. A auxiliary flow-in hole 152 horizontally crossed at center of the pierced through hole 150 is formed so as to be able to communicate with high pressure side fluid path 12, so that a fluid of the high pressure side fluid path 12 flows to top and bottom auxiliary holes 153, 153' through the auxiliary flow-in hole 152 upon blocking the fluid paths 12, 12' by the valve plug 15.

In the present invention, while the valve sleeve 14 is clearly contacted by the valve plug 15, the valve chamber 11 should be made such that space at the top valve chamber 110 is always larger than the space of the bottom valve chamber 111.

In the drawings, reference numeral symbol 180 is a sealing packing; a numeral 181 is a stem packing; and numeral 182 is fixing bolts.

An operation of the present invention constructed in this manner follows:

As shown in FIG. 2, at a time when an opening/closing operation is initiated by rotating the closely contacting valve plug 15 with the valve sleeve 14 of the valve chamber 11, the valve plug 15, made in top cut conical shape and urged by the compressional coil spring 17, is pressed against the valve sleeve 14. While a sealing operation continues even without excessively close-contacting the plug 15, whereby an opening/closing operation of the valve can be smoothly made.

Since the valve plug 15 is pressed toward a sealing direction of the valve sleeve 14 by the compressional coil spring 17, a tight sealing state always maintained. The valve can be opened which contacts the valve plug 15 at the and closed with little force by rotating the valve stem 16 connecting groove 151. The connecting groove 151 is at a top center of the valve plug 15.

When opening/closing the valve during, a fire where the valve sleeve 14 made of teflon resin is burned, as shown in FIG. 3, the valve plug 15 is dropped until it abuts the contacting protrusions 13, 13' located at the ends of the fluid paths 12, 12' within the valve chamber 11. Therefore, a closely sealed metal to metal seal is made by the valve plug 15 being urged by the compressional coil spring 17.

Since the valve plug 15 of the present invention is made in top cut conical (frusto-conical) shape and urged by the compressional coil spring 17 whereby a sealing operation is performed when the valve sleeve 14 is burned; After the valve sleeve 14 is burned, the valve plug 15 having a top cut conical (frustro-conical) shape is dropped whereby valve sleeve 14 closely contacts the contacting protrusions 13, 13' located at the ends of the fluid paths 12, 12'. The protrusion 13, 13' have a slant surface of broad width.

And, FIG. 4 shows a structure of another embodiment of the present invention; in which the top and bottom auxiliary holes 153, 153' and the auxiliary flow-in hole 152 are respectively formed at the pierced through hole 150 of the plug 152. When the fluid paths 12, 12' are blocked by the valve plug 15, a fluid pressure is sent to the top and bottom valve chambers 110, 111 via the top and bottom auxiliary holes 153, 153' through the auxiliary flow-in hole 152 from the high pressure side fluid path 12.

Thus, when a fluid is flowed to both the top and bottom valve chambers 110, 111, a strong fluid pressure is produced in a direction from the top valve chamber 110 (the top valve chamber having a bigger) cross section to the bottom valve chamber 111 the bottom valve chamber having a smaller cross section whereby the valve plug 15 is pressed downward to form a tight seal.

When the fluid paths 12, 12' are blocked by the valve plug 15, the fluid on the high pressure side fluid path 12 flows into the top and bottom valve chambers 153, 153' through the auxiliary flow-in hole 152 whereby a close sealing operation is maintained by both the pressure urged by the compressional coil spring 17 and the fluid pressure together. Thus, the sealing effect between the valve plug 15 and protrusions 13, 13' is further increased, whereby when more pressure exists in the interior of pipe due to fire, the more the plug is closely urged downward. Due to the difference in the cross section of the top and bottom valve chambers, even if the teflon sleeve is burned, the close sealing can be maintained by an inter-metal contact existing between the valve plug 15 and protrusions 13, 13'.

Thus, in accordance with the present invention, at a time when an opening and closing operation is made by a valve made of the plug 15, since the plug 15 is separately connected with the valve stem 16 and the close sealing operation between the valve plug 15 and the valve sleeve 14 is closely sealed by pressing by the compressional coil spring 17, a producing of gap of the sealing portion is prevented even upon long period valve using time and the opening/closing operation is smooth, and even when the valve sleeve 14 made of teflon resin would be burned by a fire, the fluid paths 12, 12' are blocked by a method in which the valve plug 15 of top cut conical shape is dropped and contacted to the contacting protrusions 13, 13' of the fluid paths 12, 12', a safety valve effect can be obtained even upon fire.

What is claimed is:

1. A valve comprising:

a frustro-conical valve plug having a through hole in a center portion of said plug, said plug having a first diameter end surface and a second diameter end surface, said first diameter end surface being larger than said second diameter surface;

a valve stem slidably connected to said large diameter end surface of said valve plug;

a spring device enclosing said valve stem;

a valve cover rotatably supporting a portion of said valve stem; and a conduit connector supporting said valve cover, said conduit connector including a frustro-conical valve chamber, said valve chamber intersecting a fluid pathway in said conduit connector, said valve chamber having a first diameter section with a first protrusion and a first valve sleeve, said first valve sleeve rotatably supporting said first diameter end surface of said valve plug, said valve chamber having a second diameter section with a second protrusion and second valve sleeve, said second valve sleeve rotatably supporting said second diameter end surface of said plug, whereby when said valve sleeves disintegrate during extreme temperature conditions, said spring device moves said valve plug in a direction towards said second diameter section wherein said first and second protrusions provide rotational support for said valve plug.

2. The valve of claim 1, wherein said valve stem further includes a flange portion adjacent said valve cover supporting an end portion of said spring device.

3. The valve of claim 1, wherein said valve cover includes fasteners penetrating through said valve cover and said conduit connector, said valve cover includes a valve stem packing supporting said valve stem and a packing between said valve cover and said conduit connector.

4. The valve of claim 1, wherein said valve plug includes first, second, and third channels penetrating through an outside surface of said valve plug and intersecting said through hole, whereby said channels provide fluid flow to said valve chamber at said first and second diameter sections to create pressure at said sections, whereby said valve plug is moved by said pressure and said spring device in a direction towards said second diameter section.

5. The valve of claim 4, wherein said first channel is parallel to said fluid pathway, said second and third channels are parallel to a rotational axis of said valve stem.

6. The valve of claim 1, wherein said first and second protrusions are adjacent said fluid pathway of said conduit connector.

* * * * *